US012635619B2

(12) United States Patent
Montagano

(10) Patent No.: US 12,635,619 B2
(45) Date of Patent: May 26, 2026

(54) LOCKABLE INDOOR/OUTDOOR CULTIVATOR

(71) Applicant: MONDI PRODUCTS LTD., Vancouver (CA)

(72) Inventor: Michael Montagano, Burnaby (CA)

(73) Assignee: MONDI PRODUCTS LTD., Vancouver (CA)

( * ) Notice: Subject to any disclaimer, the term of this patent is extended or adjusted under 35 U.S.C. 154(b) by 0 days.

(21) Appl. No.: 18/282,387

(22) PCT Filed: Mar. 24, 2022

(86) PCT No.: PCT/CA2022/050441
§ 371 (c)(1),
(2) Date: Sep. 15, 2023

(87) PCT Pub. No.: WO2022/198326
PCT Pub. Date: Sep. 29, 2022

(65) Prior Publication Data
US 2024/0155982 A1      May 16, 2024

Related U.S. Application Data

(60) Provisional application No. 63/165,230, filed on Mar. 24, 2021.

(51) Int. Cl.
*A01G 13/31*        (2025.01)
*A01G 9/02*         (2018.01)
(52) U.S. Cl.
CPC ............... *A01G 13/31* (2025.01); *A01G 9/02* (2013.01)
(58) Field of Classification Search
CPC ........ A01G 13/26; A01G 13/20; A01G 13/22; A01G 13/00; A01G 9/14; A01G 9/16; B65D 45/16; B65D 55/04
See application file for complete search history.

(56) References Cited

U.S. PATENT DOCUMENTS

| | | | | |
|---|---|---|---|---|
| 1,465,329 A | * | 8/1923 | Arbuthnot | .............. B65D 45/16 |
| | | | | 292/120 |
| 2,695,806 A | * | 11/1954 | Balint | ................... B65D 45/18 |
| | | | | 292/288 |

(Continued)

FOREIGN PATENT DOCUMENTS

| | | | | |
|---|---|---|---|---|
| CA | 2154738 A1 | 2/1996 | | |
| DE | 811558 C | 8/1951 | | |
| DE | 8528838 U1 | * 10/1985 | | |
| DE | 4217644 C1 | * 10/1993 | ......... | B65D 43/0212 |

(Continued)

OTHER PUBLICATIONS

Mondi Products Ltd., European Patent Application No. 22773847.3, Extended European Search Report, Jan. 3, 2025.

(Continued)

*Primary Examiner* — Kristen C Hayes
(74) *Attorney, Agent, or Firm* — Moore & Van Allen PLLC; Jeffrey R. Gray

(57) ABSTRACT

A lockable cultivator for growing crops. The cultivator defining an enclosed growing environment including a cover (aka dome) defining a volume in which the plants can grow, a tray (aka container) for receiving a growing medium in which the seeds can germinate and/or the roots can grow. A downwardly oriented channel is provided on the edge of the tray on which the dome rests when installed together. A clip (attachment device/means) is provided to releasably connect the dome to the tray to prevent accidental disengagement. The clip having a first section which is adapted to be inserted into the channel, and a second section which is adapted to snap into the recess, wherein insertion of the first section into the channel activates a substantially horizontal tension force that pushes the second section to snap into the recess and a vertical tension force that pushes the cover onto the tray.

16 Claims, 6 Drawing Sheets

(56)     References Cited

U.S. PATENT DOCUMENTS

| | | | | |
|---|---|---|---|---|
| 3,360,644 | A | * | 12/1967 | Ottar ....................... F21V 31/00 |
| | | | | 362/351 |
| 3,823,967 | A | * | 7/1974 | Knize .................... B65D 45/16 |
| | | | | 292/258 |
| 4,119,239 | A | * | 10/1978 | Anderson .......... B65D 43/0212 |
| | | | | 220/784 |
| 4,501,378 | A | * | 2/1985 | Berfield ................. B65D 45/18 |
| | | | | 292/87 |
| 4,632,272 | A | * | 12/1986 | Berenfield ............. B65D 45/16 |
| | | | | 206/508 |
| 5,232,116 | A | * | 8/1993 | Baxter ................... B65D 45/16 |
| | | | | 292/288 |
| 5,921,422 | A | | 7/1999 | Hunter et al. |
| 10,371,181 | B1 | | 8/2019 | Reibling et al. |
| 2003/0147690 | A1 | | 8/2003 | Ronnquist |
| 2006/0249522 | A1 | * | 11/2006 | Ringo .................... B65D 45/20 |
| | | | | 220/784 |
| 2007/0228037 | A1 | * | 10/2007 | Yoshiyama ........... B65D 45/16 |
| | | | | 220/4.25 |
| 2010/0024294 | A1 | | 2/2010 | Kertz |
| 2015/0143743 | A1 | | 5/2015 | Mcclay |

FOREIGN PATENT DOCUMENTS

| | | | | |
|---|---|---|---|---|
| DE | 20015833 | U1 | * | 2/2001 ............ B65D 45/16 |
| DE | 20207727 | U1 | | 11/2002 |
| EP | 926357 | B1 | | 11/2002 |
| EP | 1446333 | A1 | | 8/2004 |
| FR | 2067879 | A5 | | 8/1971 |
| FR | 2411772 | A | * | 8/1979 ......... B65D 43/0214 |
| FR | 2724812 | A1 | | 3/1996 |
| JP | 08320006 | A | | 12/1996 |
| JP | 2000184824 | A | | 7/2000 |
| JP | 2005160386 | A | | 6/2005 |

OTHER PUBLICATIONS

Mondi Products Ltd., International Patent Application No. PCT/CA2022/050441, International Search Report, Jun. 21, 2022.
Mondi Products Ltd., International Patent Application No. PCT/CA2022/050441, Written Opinion, Jun. 21, 2022.
Mondi Products Ltd., Japanese Patent Application No. 2023-558581, Office Action, Sep. 1, 2025.
1 Mondi Products Ltd., Korean Patent Application No. 10-2023-7031617, Office Action, Jul. 4, 2025.

* cited by examiner

100

102

106

106

104

104

100

102

106

104

106

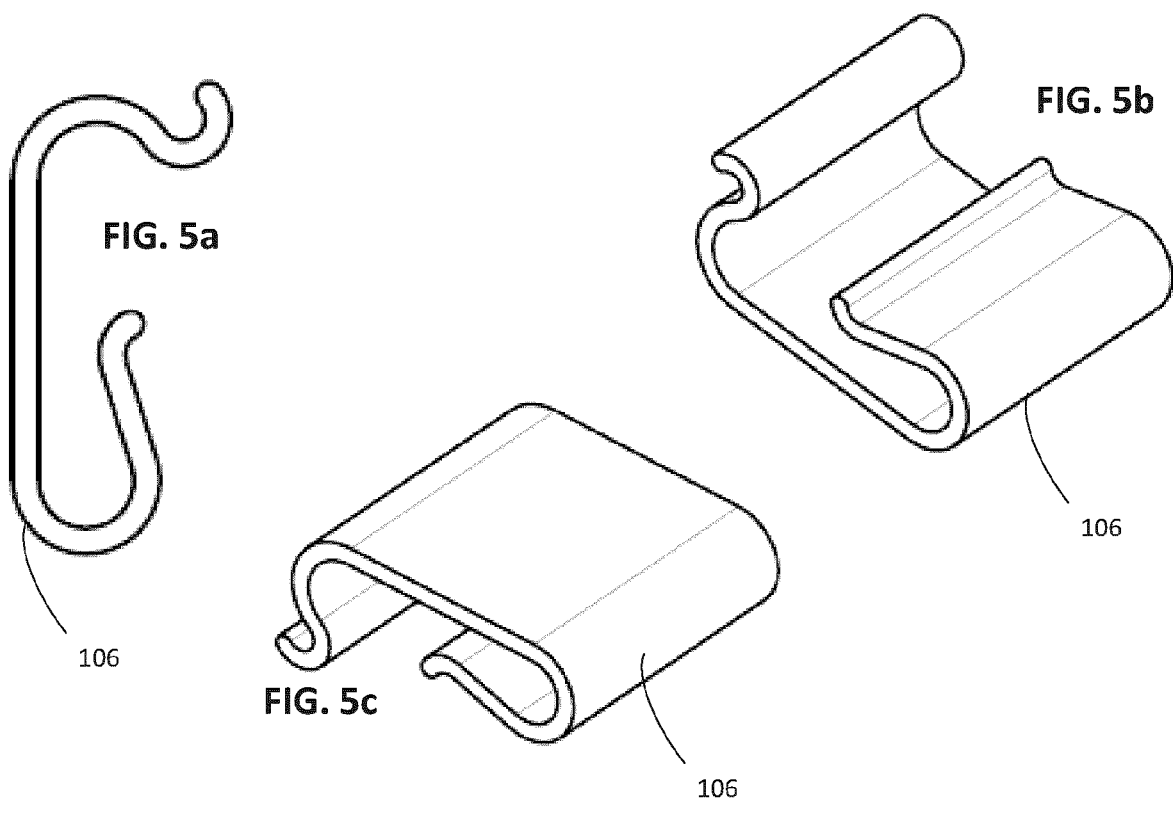
FIG. 5a
FIG. 5b
FIG. 5c
106
106
106
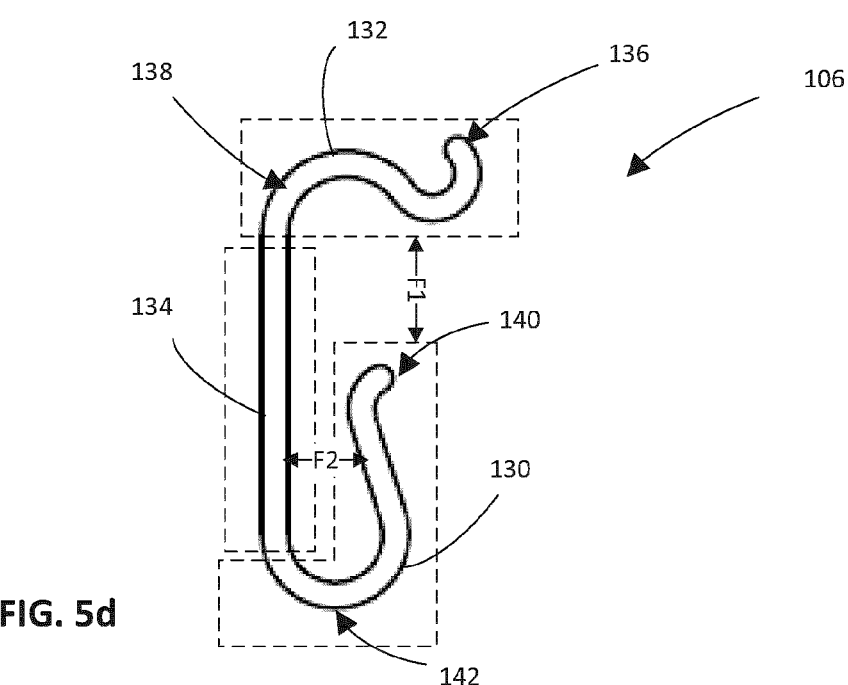
FIG. 5d
132
138
136
106
134
F1
140
F2
130
142

LOCKABLE INDOOR/OUTDOOR CULTIVATOR

CROSS REFERENCE

This application is a National Stage Patent Application (filed under 35 § U.S.C. 371) of PCT/CA2022/050441 filed Mar. 24, 2022, which, in turn claims benefit of U.S. patent application No. 63/165,230 filed Mar. 24, 2021, the specification of each of which are hereby incorporated herein by reference in their entirety.

BACKGROUND

(a) Field

The subject matter disclosed generally relates to indoor/outdoor plant cultivators.

(b) Related Prior Art

Urban/indoor cultivation has gained popularity in the recent years. Apart from being a hobby/need for many people who do not have access to land to cultivate e.g. residents of high-rise buildings, or residents of countries having extreme weather conditions etc., urban cultivation is the answer to the to the growing need for fresh vegetables and herbs.

A successful indoor cultivation requires an environment having the right combination of light intensity/color and temperature and humidity levels. Some crops are more sensitive than others with respect to the levels and increase/decrease of temperature, humidity, and light color and intensity. These factors affect the yield and the concentration of nutrients and antioxidants in the crops.

Therefore, the best cultivators to meet these conditions are those that define an enclosed growing environment. The most common ones in the market include a cover (aka dome) which mainly defines a transparent piece of plastic or other material which fits on top of a tray (aka container) that includes the soil/water in which the seed/root is placed to grow.

This type of cultivators defines an enclosed growing environment which protects the plants growing therein from any sudden changes in growing conditions such as temperature and humidity mainly during transportation from one location to the other, or when the cultivator is placed outdoors for exposure to the sun.

However, due to the weight of the dome and its center of gravity which is sometimes elevated (depending on the height of the dome), the slightest movements during transportation e.g. turn, sudden start/stop, or exposure to wind can cause the dome to disengage the tray and fall, thereby, damaging the dome and exposing the plants to the external weather conditions which can cause the burning/freezing/drying of the plants and result in their death or the slowing of their growth.

Therefore, there is a need for a cultivator that addresses these problems.

SUMMARY

The present embodiments describe such cultivator.

According to one aspect, there is provided a cultivator for growing crops, comprising a tray/cover for receiving a growing medium, the tray having a sidewall defining an edge and a side skirt, the sidewall and the side skirt defining a downwardly facing channel; a cover shaped and dimensioned to fit over the tray for creating a growing environment, the cover defining a recess on a surface thereof that abuts the edge of the tray; and a clip for releasably securing the cover to the tray, the clip having a first section having a first free end adapted for insertion into the channel, and a second section perpendicular to the first section and having a second free end adapted to snap into the recess, wherein insertion of the first free end of the first section into the channel activates a substantially horizontal tension force that pushes the second free end of the second section to automatically snap into the recess.

The cultivator may further comprise a third section connecting the first section and the second section, wherein the horizontal tension force is activated when the first section and the third section are moved away from each other as the first section is inserted upward into the channel.

The first section and the second section may be S-shaped.

The cultivator may be configured to define a vertical tension force between the first section and the second section, the vertical tension force being activated when the second section is moved upward away from the first section, the second tension force for pressing the cover onto the tray when the clip is in position.

In an embodiment, the recess is defined by an extrusion provided onto a lip of the cover that abuts the edge of the tray.

According to another aspect, there is provided a cultivator for growing crops, comprising: a tray for receiving a growing medium for growing the crops therein; a cover shaped and dimensioned to fit over the tray for creating a growing environment; a clip for releasably securing the cover to the tray; the tray comprising a sidewall having an edge for receiving the cover, and a channel; the cover defining a recess; and the clip having a first end adapted to be received in the channel and a second end adapted to be received in the recess, the clip being shaped and dimensioned to have a tension force which is activated when the clip is installed to secure the tray to the dome and to keep the clip in position during operation.

The clip may comprise a first section comprising the first end, a second section comprising the second end and third section that connects the first section and the second section.

The first section and the second section may be provided to be substantially perpendicular to each other, and the first section and the third section may be provided to be substantially parallel to each other.

The first section comprising the first free may be is S-shaped.

The cultivator may be designed to define a first tension force between the first section and the third section and is activated by moving the third section away from the first section.

The first tension force may be substantially horizontal, the first tension force being adapted to push the second end of the second section toward the recess as the first section is being inserted into the channel.

The second section comprising the second free end maybe S-shaped.

A second tension force may exist between the second section and the third section, the second tension force being activated when the second section is moved upward away from the first section, the second tension force for pressing the cover onto the tray.

In an embodiment, the third section may be designed to be flat or to define a curve.

The tray/container may be one of: a tray/container having a solid bottom which is waterproof, a tray/container having a solid bottom comprising holes, a tray/container having a mesh bottom defining holes, and a tray/container having no bottom.

In an embodiment, the recess is defined by an extrusion formed onto a lip of the cover that abuts the edge. In another embodiment, the recess is defined by a cutout/opening formed onto the cover.

According to another aspect, there is provided a clip for securing a cover to a tray/container, the clip comprising: a first section having a first free end adapted for insertion into a channel provided on the tray/container; a second section having a second free end adapted for insertion into a recess formed onto a surface of the cover; and a third section that connects the non-free ends of the first section and the second section; the clip defining a tension force which is activated when the first free end and the second free end are installed in position, the tension force being for securing the tray to the cover and for securing the clip to the tray/cover assembly.

The clip may be designed to define a horizontal tension force between the first section and the third section and is activated by moving the third section away from the first section, the tension force being adapted to push the second end of the second section toward the recess when the first free end of the clip is inserted into the channel.

The clip may also be designed to define a vertical tension force between the first section and the second section, the vertical tension force being activated when the second section is moved upward away from the first section, the second tension force for pressing the cover onto the tray during engagement.

According to another aspect, there is provided a method for locking a cultivator comprising a tray having a channel depending from a sidewall of the tray to a cover adapted to fit over the tray, the method comprising: providing a recess onto the cover; and using a clip for releasably securing the cover to the tray, the clip having a first section having a first free end which is adapted to be inserted into the channel, and a second section having a second free end which is adapted to snap into the recess, the clip defining a tension force which is activated when the first free end and the second free end are installed in position.

In an embodiment, providing the recess comprises providing the recess onto a surface of the cover that abuts the edge of the tray.

The present invention will be more readily understood by referring to the following examples which are given to illustrate the invention rather than to limit its scope. In particular, the following embodiments illustrate and describe a non-limiting example of a clip which hooks into the channel defined by the edge of the tray and snaps onto an recess provided on a lower lip of the dome that rests onto the edge. However, other embodiments are also contemplated whereby a clip/attachment device/attachment means can hook into the recess on one end and snap into the channel on the other end, or snap into both from both ends. The recess may define a volume that protrudes from the surface of the edge as shown in the figures and can also define an opening/cutout provided on the lip of the dome that preferably overlaps another opening provided onto the edge of the tray whereby the clip can hook or snap into both to connect the dome and the tray.

Features and advantages of the subject matter hereof will become more apparent in light of the following detailed description of selected embodiments, as illustrated in the accompanying figures. As will be realized, the subject matter disclosed and claimed is capable of modifications in various respects, all without departing from the scope of the claims. Accordingly, the drawings and the description are to be regarded as illustrative in nature, and not as restrictive and the full scope of the subject matter is set forth in the claims.

BRIEF DESCRIPTION OF THE DRAWINGS

Further features and advantages of the present disclosure will become apparent from the following detailed description, taken in combination with the appended drawings, in which:

FIGS. 5a to 5c illustrate, respectively, a side view, a bottom view, and a side perspective view of a clip, in accordance with an embodiment;

FIG. 5d illustrates an amplified side view of clip of FIG. 5a; and

It will be noted that throughout the appended drawings, like features are identified by like reference numerals.

DETAILED DESCRIPTION

The embodiments describe a lockable cultivator for growing crops. The cultivator defining an enclosed growing environment including a cover (aka dome) defining a volume in which the plants can grow, a tray (container) for receiving a growing medium in which the seeds can germinate and/or the roots can grow. A downwardly oriented channel is provided on the edge of the tray on which the dome rests when installed together. A clip (attachment device/means) is provided to releasably connect the dome to the tray to prevent accidental disengagement. The clip defines a first section which is adapted to be inserted into the channel, and a second section which is adapted to snap into the recess, wherein insertion of the first section into the channel activates a substantially horizontal tension force that pushes the second section to snap into the recess. The clip may also be designed to define a vertical tension force that pushes the cover onto the tray.

Figure 1A:
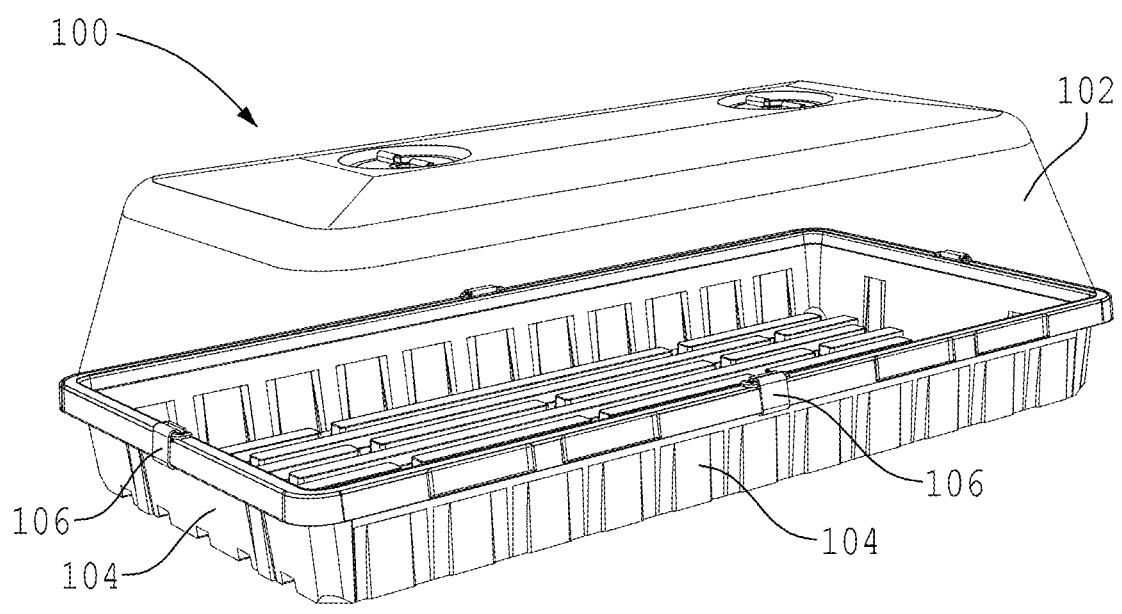
FIGS. 1a to 1c illustrate different views of a cultivator, in accordance with the present embodiments.
Figure 1B:
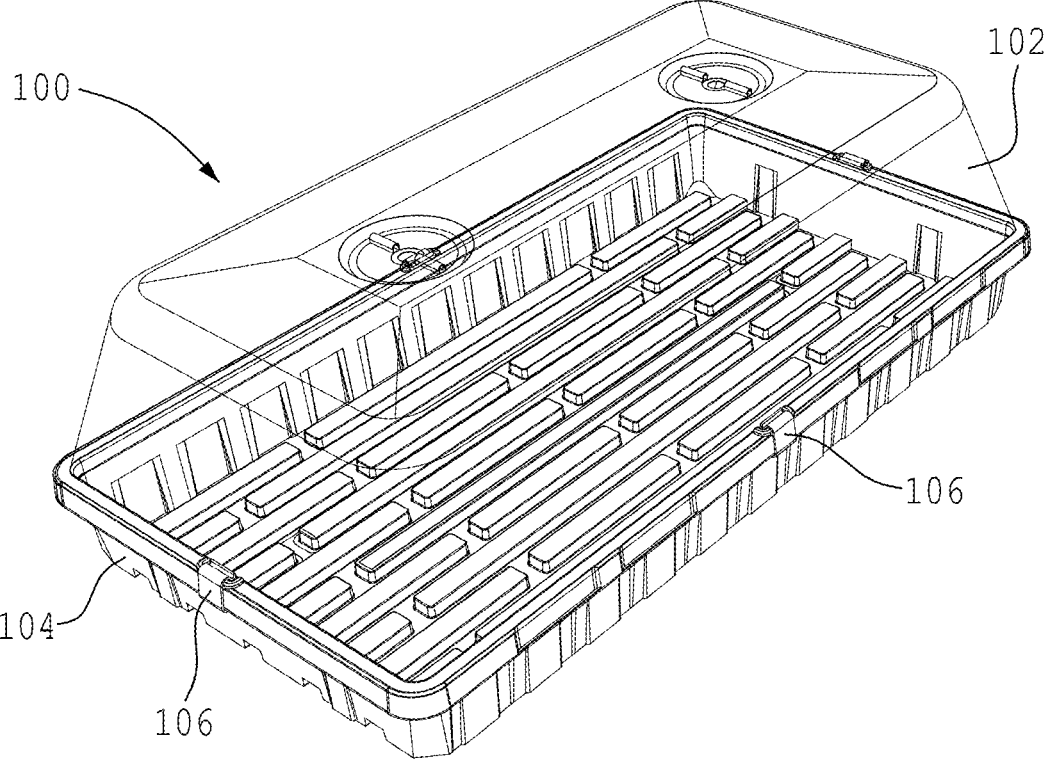
Figure 2:
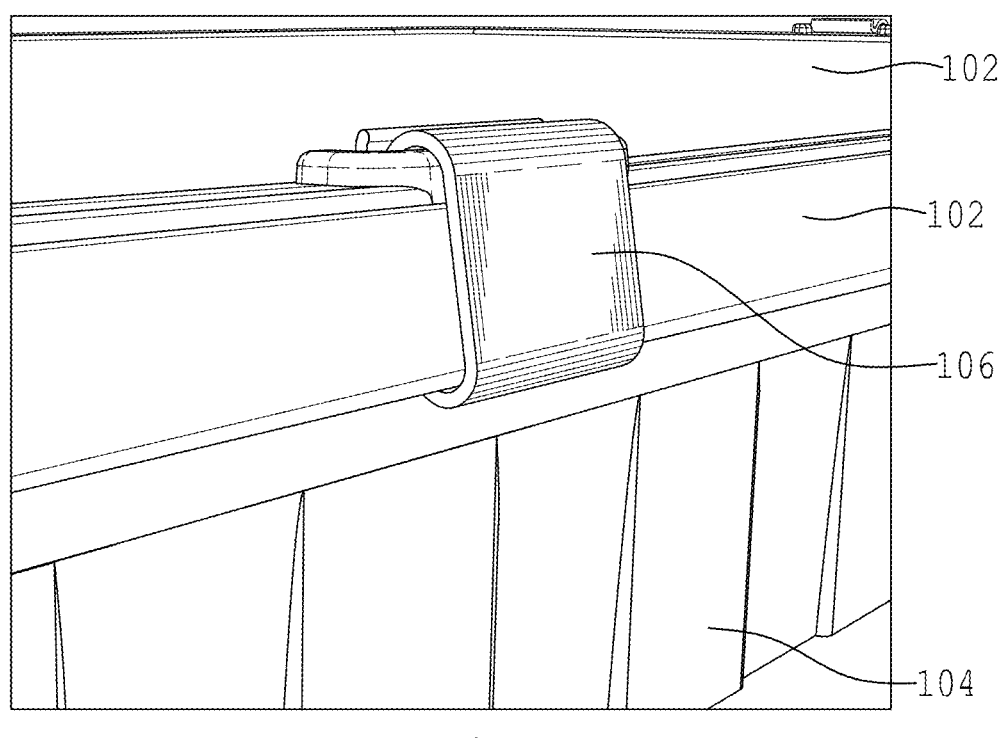
FIG. 2 is close up view of the clip in operative position wherein the clip connects the dome and the tray in a lockable position, in accordance with the present embodiments.

Referring now to the drawings which illustrate the first example, and more particularly to FIGS. 1A & 1B, there is described a cultivator in accordance with the present invention. As shown in FIGS. 1A & 1B the cultivator 100 comprises a dome 102, a tray 104 and a clip 106 shaped and dimensioned to releasably lock the dome 102 and the tray 104 together to prevent accidental disengagement. FIG. 2 is close-up view of the clip 106 in operative position wherein the clip 106 connects the dome 102 and the tray 104 in a lockable position.

Figure 1C:
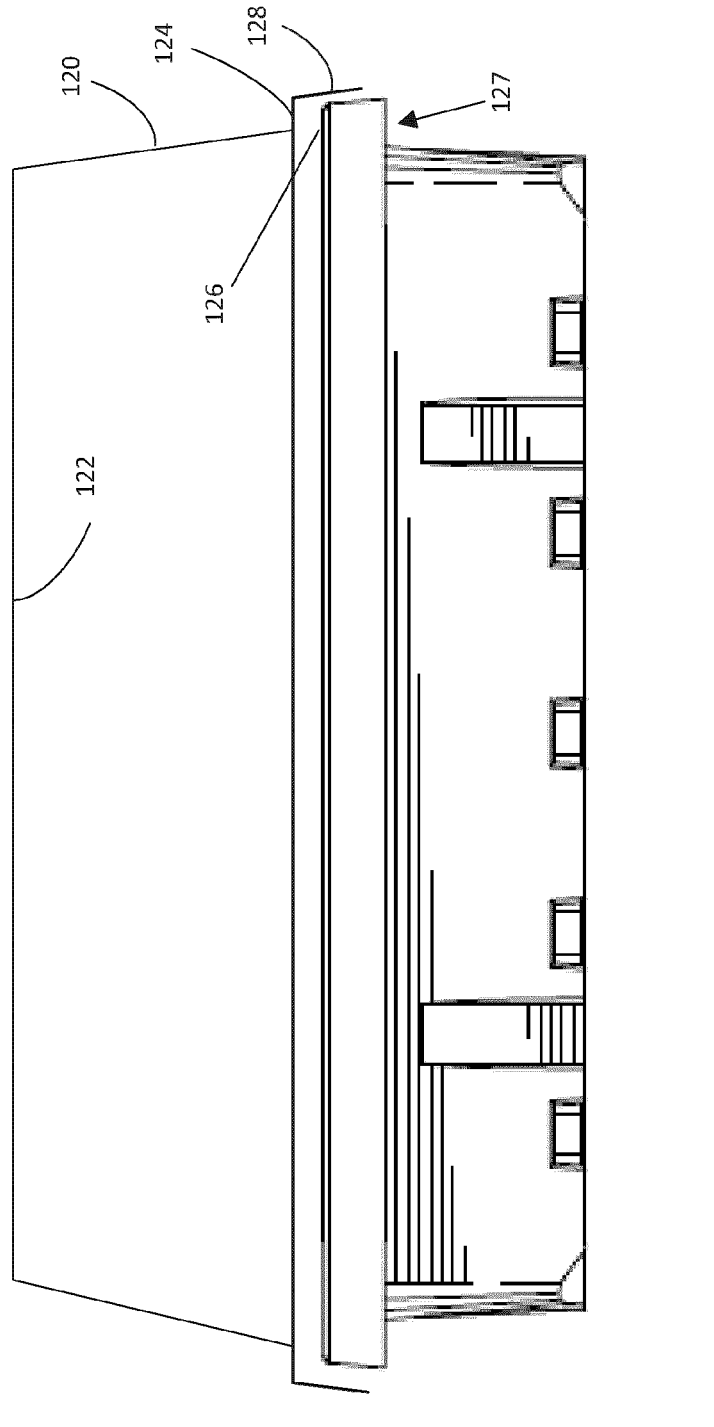

In an embodiment, and with reference to FIG. 1c, the dome comprises a sidewall 120, a ceiling 122 extending from or connected to an upper end of the sidewall 120, a lower lip 124 extending outwardly (and substantially horizontally) from the lower end of the sidewall 120 and designed to rest onto an edge 126 of the matching tray 104. The tray 104 defines a bottom surface and a sidewall depending therefrom and defining the depth of the tray 104. The sidewall defines an edge 126 for receiving the dome thereon. The edge comprises a side skirt which, together with the sidewall, defines a downwardly oriented channel which the embodiments use to receive the clip to secure the dome onto the tray. A side skirt 128 may also be preferably provided onto the dome which depends from the lip 124 and extends downwardly to abut/cover/surround the side skirt of the edge 126 which defines the channel of the tray as exemplified in FIG. 1c. This arrangement allows for the dome to rest on the tray 104 and receive the edge 126 within it to prevent horizontal movement of the dome with respect to the tray but this is not sufficient to prevent disengagement of the dome from the tray during movement and windy conditions.

Figures 4A, 4B:
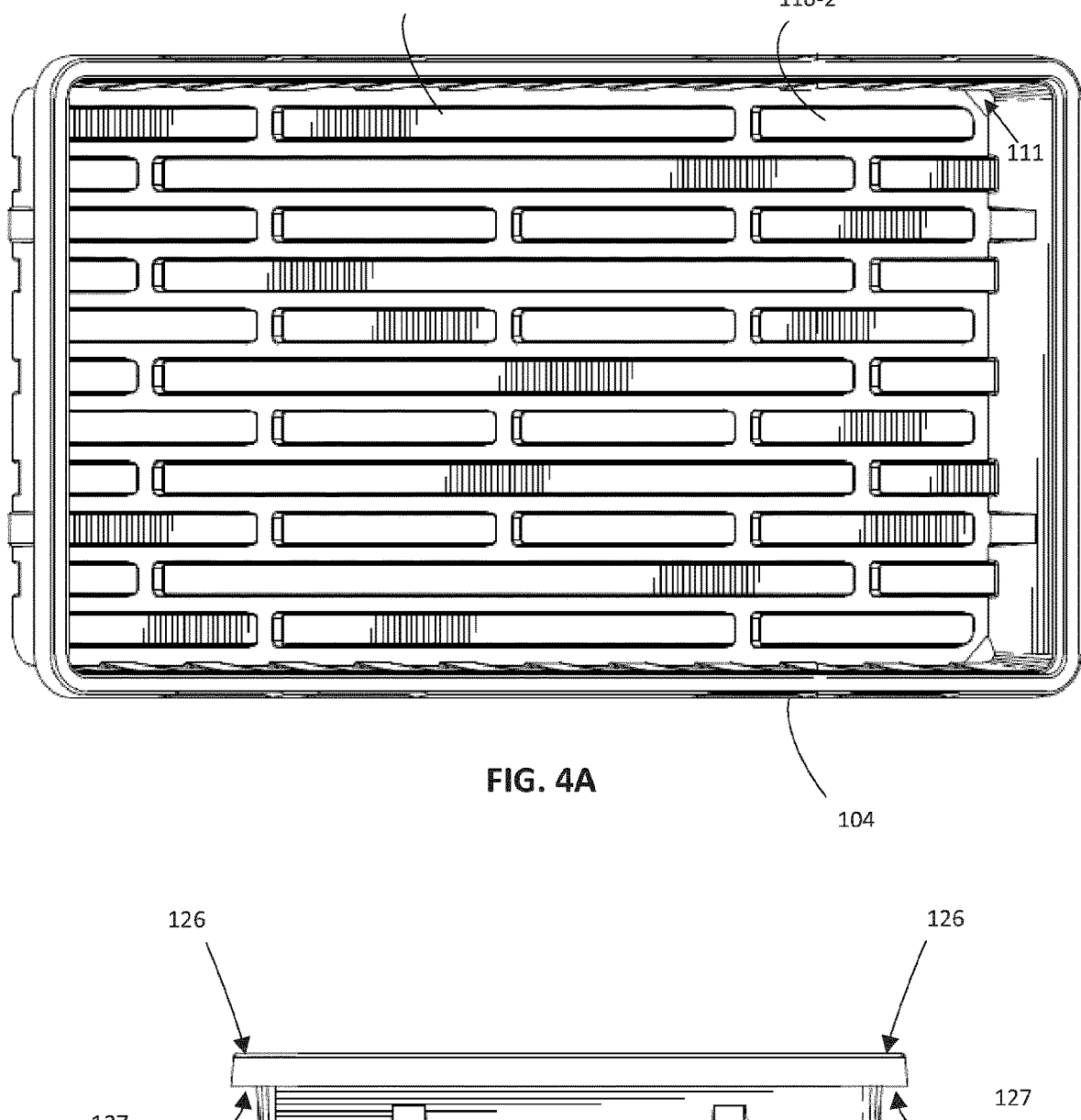
FIGS. 4a and 4b are top views and side views respectively, of an example of a tray, in accordance with the present embodiments.

FIGS. 4a and 4b are top views and side views respectively, of an example of a tray 104. As exemplified in FIGS. 4a and 4b, the tray 104 comprises a lower surface and a side wall defining the depth of the tray 104 and the volume of growing media that can be received therein such as soil or other types of growing media for receiving the seed and the roots for the growth/germination of the plants. Several rows of protrusions 110 may be provided that cover the lower surface of the tray. The protrusions 110 preferably having different lengths and being separated by a given distance/gap horizontally and vertically in a manner that allows the water to be evenly distributed within the tray. In a non-limiting example and in order to improve the even distribution of water in the tray, a longer protrusion 110-1 is about two to three times longer than a smaller protrusion 110.2. The longer protrusions 110-1 being provided in the middle in order to ensure a water build up before allowing the water to move toward another row from in between the gaps. This way, water can be evenly distributed to all the roots planted in the tray even if it is dumped by the user in one area.

In another embodiment, and always with reference to FIGS. 4a and 4b, the corners of the tray 104 are shaped to define a slanted surface 111 rather than a traditional 90° angle between three surfaces, and this is to ensure rigidity and to prevent puncturing of the tray from the corners if the tray falls or gets pushed onto a sharp object/edge, whereby, if the tray falls vertically or substantially vertically in a direction of landing on a corner, it will land on the surface 111 parallel to the ground rather than on a sharp 90° corner which would result in the puncturing of the tray 104 and the leakage of water therefrom.

Also as exemplified in the figures, the edge 126 of the matching tray 104 comprises a side skirt which together with the sidewall defines a downwardly oriented channel 127 which the user can use for grabbing/holding the tray 104 and/or the cultivator assembly 100. As will be described below, this channel 127 is used to receive one end of the clip 106 in a hooking manner to secure the dome onto the tray to prevent accidental disengagement.

Figure 3:
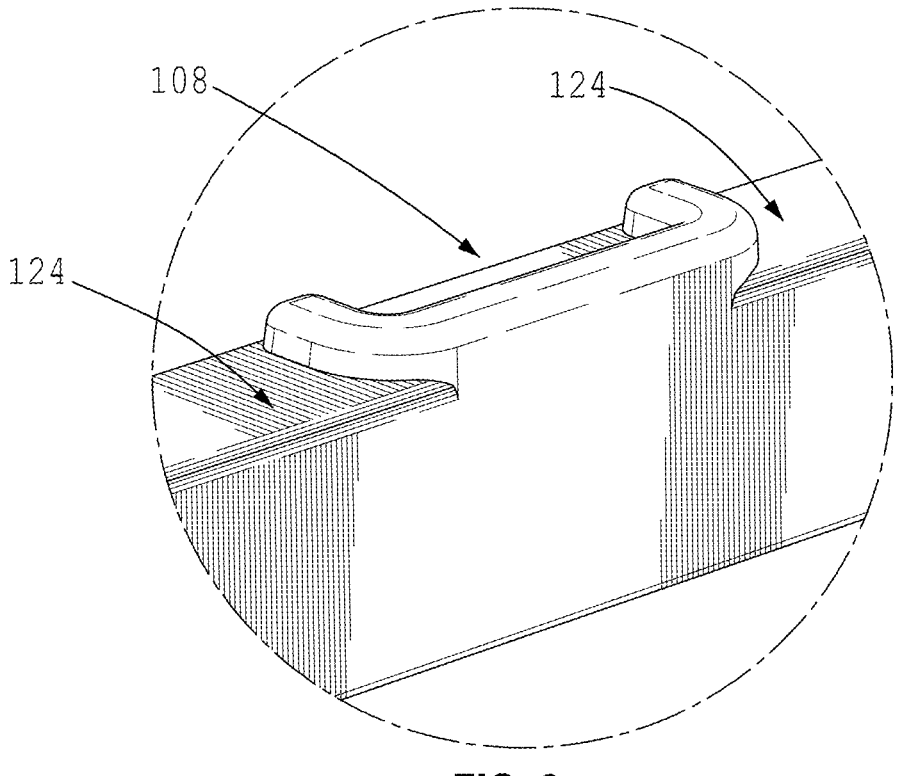
FIG. 3 illustrates an example of a recess adapted to receive the clip on the dome, in accordance with the present embodiments.

Now referring to FIG. 3, there is illustrated an example of a recess 108 formed on the lip 124 of the dome that is designed to rest onto the edge 126 of the tray during operation. The recess 108 in the present example is shaped in the form of a pocket/gap/channel to receive and engage another end of the clip 106 in order to secure the dome 102 to the tray 104. In a non-limiting example, the recess 108 is defined by a U-shaped wall protrusion that protrudes from the lip 124 to create a substantially rectangular pocket that is shaped to receive the clip therein. Other embodiments are also possible for the provision of the recess.

FIGS. 5a to 5c illustrate, respectively, a side view, a bottom view, and a side perspective view of a clip 106 in accordance with an exemplary embodiment of the invention. FIG. 5d is an amplified side view of the exemplary clip shown in the figures. As shown in FIG. 5d, the clip 106, which despite being integrally made in one unit, comprises three sections which are geometrically and/or functionally different from each other. Namely: a first section 130 which is substantially S-shaped, a second section 132 which is also substantially S-shaped, and a third section 134. In the present example, the second section 132 and the first section 130 are connected by the third section 134 which is shown to be flat but may also define different shapes e.g. curved. In the present example, the second section 132 is substantially perpendicular to the third section 134 (and the first section 130), and the first section 130 is substantially parallel to the third section 134. The second section 132 comprises a curved tip 136 which is shaped and dimensioned to smoothly snap into the recess 108 and to be removed therefrom by the user. The tip 136 is shown to be oriented upwardly (but can also be oriented in the opposite direction as long as it offers smooth snapping into the recess and removal therefrom). Another curved portion 138 is provided on the other side of the second section 132 which is downwardly oriented to connect to the third section 134. The first section 130 also comprises a curved tip 140 shaped and dimensioned for smooth insertion into the channel of the tray, and another curved end 142 which connects to the other end of the third section 134.

In the embodiments, the clip 106 is made of a flexible/elastic material which together with the shapes of the different sections (mainly the non-free ends of the S-shapes) creates a first tension (elastic/springy) force F1 (which is substantially vertical) between second section 132/tip 136 and the first section 130 to secure the dome 102 to the tray 104 by pressing the lower lip 124 of the dome onto the edge 126 of the tray 104. The force F1 is achieved mainly by the shape of the curved section 138 between the second section and the third section. In an embodiment, the clip may also be designed to create a second tension (elastic/springy) force F2 (which is substantially horizontal) between the third section 134 and the first section 130 for automatically snapping the tip 136 of the second section into the recess when the clip is inserted into the channel while also preventing disengagement of the tip 136 from the recess and pressing the side skirt 128 of the dome against the edge 126 of the tray. The force F2 is mainly achieved by the shape of the curved end 142.

In operation, when the user wants to secure the dome to the tray using the clip, the curved tip/end 140 of the first section 130 of the clip is first inserted within the channel 127 defined by the edge 126 of the tray 104 and the clip is moved/pushed upward into the channel 127, this will activate the force F2 and pushes the second section 132 toward the dome, and thus, when the curved end 136 of the second section reaches the recess 108 defined on the bottom lip 124 of the dome, it will engage the recess 108 in a snapping manner either automatically by virtue of the force F2 or by adding a slight push forward toward the dome to engage the curved end 136 in the recess 108, to thereby releasably secure the dome 102 onto the tray 104 as exemplified in FIG. 2.

In other words, the force F2 pushes the curved tip 136 of the second section 132 toward the recess 108 as the first section 130 is being inserted upwardly into the channel 127, as described above. Therefore, by pushing the clip up the channel the clip will engage and snap in place automatically to secure the dome to the tray. The way the different sections of the clip are configured allow both forces F1 and F2 to secure the dome onto the tray and to secure the clip into the recess as the clip is being installed/mounted in place.

The releasing of the clip maybe done by applying the reverse force onto the curved tip 136 to disengage it from the recess and then lower the clip downward to disengage the first section 130 from the channel 127 of the tray.

While preferred embodiments have been described above and illustrated in the accompanying drawings, it will be evident to those skilled in the art that modifications may be made without departing from this disclosure. Such modifications are considered as possible variants comprised in the scope of the disclosure.

Figure 6:
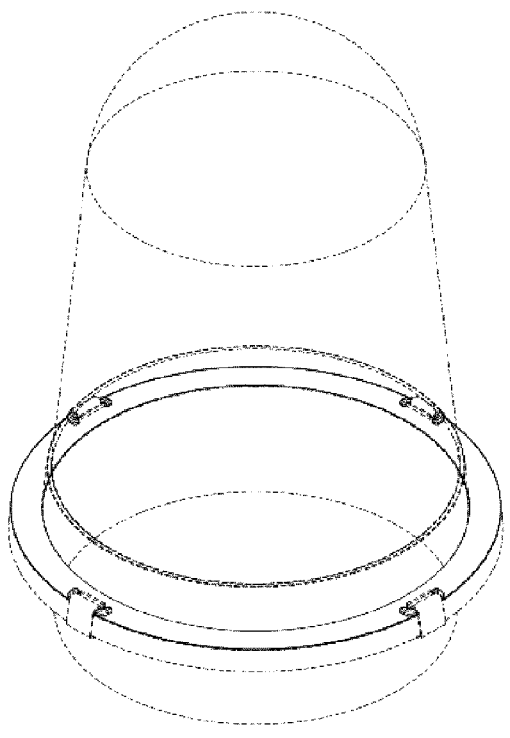
FIG. 6 illustrates an example of a cultivator having a circular/oval shape, in accordance with another embodiment.

For example, the dome (and its matching tray) can be rectangular, square, oval or circular and may have other regular and irregular shapes. For rectangular/square domes, the dome 102 can include recesses 108 on opposite sides thereof, or preferably on all four sides. Furthermore, each side can include one or more recesses 108 as needed. Trays that are circular/oval can include at least two recesses but preferably three or more as exemplified in FIG. 6.

The trays can vary in shape and depth to include shallow trays, pots, and any other container that is suitable for holding a growing media. Other embodiments of the tray can also include trays having solid bottoms (waterproof or with holes), mesh bottoms trays (with and without holes), and container/trays without bottoms whereby a sidewall having the above features can simply be inserted into the ground or into the growing media e.g. water while allowing a cover/ dome to be releasably locked onto it using the embodiments described herein.

Other embodiments are also possible for the recess (aka pocket/gap/channel) intended to receive the tip 136 of the clip. For example, a cutout may be provided in both the dome and the edge of the tray, which is shaped and dimensioned to receive the tip 136 of the clip therein, instead of providing a recess using an extrusion as shown in the embodiments.

In other embodiments, instead of a channel that surrounds the edge of the tray to receive the first section of the clip, other means may be provided on the sidewall of the tray to receive the first section such as local channels provided to match the positions of the recesses/hooks intended to receive the tip 136 on the dome.

The invention claimed is:

1. A cultivator for growing crops, comprising:
   a tray/container for receiving a growing medium, the tray/container having a sidewall defining an edge and a downwardly facing channel;
   a cover shaped and dimensioned to fit over the tray/ container for creating a growing environment, the cover defining a recess on a surface thereof that abuts the edge of the tray/container; and
   a clip for releasably securing the cover to the tray/ container, the clip being integrally made in one unit, the clip having a first section having a first free end adapted for insertion into the channel, a second section substantially perpendicular to the first section and having a second free end adapted to snap into the recess, and a third section that connects the first section and the second section, the first section and the third section being substantially parallel to each other;
   wherein insertion of the first free end of the first section upward into the channel activates a substantially horizontal tension force that pushes the second free end of the second section to automatically snap into the recess when the second free end reaches the recess.

2. The cultivator of claim 1, wherein the horizontal tension force is activated when the first section and the third section are moved away from each other as the first section is inserted upward into the channel.

3. The cultivator of claim 1, wherein the first section and the second section are S-shaped.

4. The cultivator of claim 1, wherein a vertical tension force exists between the first section and the second section, the vertical tension force being activated when the second section is moved upward away from the first section, the vertical tension force for pressing the cover onto the tray/ container when the clip is in position.

5. The cultivator of claim 1, wherein the recess is defined by an extrusion provided onto a lip of the cover that abuts the edge of the tray/container.

6. A cultivator for growing crops, comprising:
   a tray/container for receiving a growing medium for growing the crops therein;
   a cover shaped and dimensioned to fit over the tray/ container for creating a growing environment;
   a clip for releasably securing the cover to the tray/ container;
   the tray/container comprising a sidewall having an edge for receiving the cover, and a channel;
   the cover defining a recess; and
   the clip being integrally made in one unit and having a first end adapted to be received in the channel and a second end adapted to be received in the recess, the clip being shaped and dimensioned to have a tension force which is activated when the first end of the clip is inserted upwardly into the channel to automatically snap the second end into the recess to secure the tray/container to the cover when the second end reaches the recess;
   wherein the clip comprises a first section comprising the first end, a second section comprising the second end and third section that connects the first section and the second section, the first section and the second section being substantially perpendicular to each other, and the first section and the third section being substantially parallel to each other.

7. The cultivator of claim 6, wherein the first section comprising the first free end is S-shaped.

8. The cultivator of claim 6, wherein a first tension force exists between the first section and the third section and is activated by moving the third section away from the first section.

9. The cultivator of claim 8, wherein the first tension force is substantially horizontal, the first tension force being adapted to push the second end of the second section toward the recess as the first section is being inserted into the channel.

10. The cultivator of claim 6, wherein the second section comprising the second free end is S-shaped.

11. The cultivator of claim 10, wherein a second tension force exists between the second section and the third section, the second tension force being activated when the second section is moved upward away from the first section, the second tension force for pressing the cover onto the tray/ container.

12. The cultivator of claim 6, wherein the tray/container is one of:

having a solid bottom which is waterproof, having a solid bottom comprising holes, having a mesh bottom defining holes, or having no bottom.

13. The cultivator of claim 6, wherein the recess is defined by an extrusion formed onto a lip of the cover that abuts the edge.

14. The cultivator of claim 6, wherein the recess is defined by a cutout/opening formed onto the cover.

15. A method for locking the cultivator of claim 6, the method comprising:

releasably securing the cover to the tray/container by installing the clip to the channel of the tray/container and the recess of the cover.

16. The method of claim 15, wherein installing the clip comprises inserting the first free end of the clip into the channel until the second free end snaps into the recess to thereby releasably secure the tray/container to the cover.

\* \* \* \* \*